US006958753B2

(12) United States Patent
Abe

(10) Patent No.: US 6,958,753 B2
(45) Date of Patent: Oct. 25, 2005

(54) METHOD AND APPARATUS FOR REDUCING THREE-DIMENSIONAL SHAPE DATA

(75) Inventor: Yoshihisa Abe, Sakai (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/748,141

(22) Filed: Dec. 27, 2000

(65) Prior Publication Data

US 2002/0003539 A1 Jan. 10, 2002

(30) Foreign Application Priority Data

Dec. 27, 1999 (JP) .......................................... 11-371265
Dec. 27, 1999 (JP) .......................................... 11-371266

(51) Int. Cl.⁷ .............................................. G06T 15/30

(52) U.S. Cl. ........................ 345/423; 345/419; 382/256

(58) Field of Search ................................ 345/419, 423; 382/256

(56) References Cited

U.S. PATENT DOCUMENTS 5,559,901 A * 9/1996 Lobregt ....................... 382/256
5,590,248 A * 12/1996 Zarge et al. ................. 345/421
6,262,737 B1 * 7/2001 Li et al. ...................... 345/419

OTHER PUBLICATIONS

Garland et al., Surface Simplification Using Quadric Error Metrics, Proceedings of SIGGRAPH '97, pp. 1–7.*

"A Hierarchial Approximation for 3D Polygon Models", by Horikawa et al., Proceedings of the 5th Sony Research Forum (1995), pp. 3–7.

"Simplification Envelopes", by Cohen et al., Proceedings of SIGGRAPH '96 (1996).

"Surface Simplification Using Quadric Error Metrics", by Garland et al., Proceedings of SIGGRAPH '97 (1997).

* cited by examiner

Primary Examiner—Kimbinh T. Nguyen
(74) Attorney, Agent, or Firm—McDermott Will & Emery LLP

(57) ABSTRACT

A method and apparatus for reducing three-dimensional shape data, includes calculating estimation values for portions to be deformed by converging two or more vertices of a polygon model, and reducing the number of data for the polygon model by converging two or more vertices of the polygon model when the estimation values are equal to or below the predetermined permissible value. Estimation values for surfaces to be deformed by shrinking edges or surfaces are calculated based on distances between the respective surfaces and all the original vertices involved in the surface deformation. Before each data reduction, the portion having been involved in all the previous data reductions is defined as a reduction prohibition area, and a succeeding data reduction is applied to a portion other than the reduction prohibition area.

22 Claims, 11 Drawing Sheets

METHOD AND APPARATUS FOR REDUCING THREE-DIMENSIONAL SHAPE DATA

This application is based on patent application Nos. 11-371265 and 11-371266 filed in Japan, the contents of which are hereby incorporated by references.

BACKGROUND OF THE INVENTION

This invention relates to a method and apparatus for reducing three-dimensional shape data forming a polygon model.

A huge number of measurement data are obtained by, for example, a three-dimensional shape measuring apparatus having quite a high space resolution if an image quality is high. Accordingly, if the data have a higher image quality than necessary, it disadvantageously results in a large burden on a storage device during succeeding processing and a considerable reduction in processing speed. Thus, it is necessary to ease this problem as much as possible by reducing the number of measurement data. However, in such a case, if a difference between a polygon model (hereinafter, referred to as approximated polygon model) formed by the measurement data after the data reduction and a polygon model formed by the actually measured three-dimensional shape data (hereinafter, referred to as original polygon model) is excessively large, the measurement data after the data reduction cannot be effectively utilized. Therefore, it is necessary to control error between the approximated polygon model and the original polygon model in the data reduction.

Particularly in the case of three-dimensional shape data obtained by a three-dimensional shape measuring apparatus, actually measured three-dimensional shape data are converted into an approximate value by the data reduction. Thus, error between the approximated polygon model and the original polygon model is preferably controlled using the actually measured three-dimensional shape data as a reference.

On the other hand, various methods have been proposed to reduce the number of three-dimensional data forming a triangular polygon model by approximating a model within a desired permissible error range.

For example, in "Hierarchical Approximation of Three-Dimensional Polygon Models" (by Horikawa and Totsuka, pp. 3–7 of Proceedings of the 5$^{th}$ Sony Research Forum, 1995) is disclosed a method for reducing the number of three-dimensional shape data by estimating contributions of respective edges forming a triangular polygon model in the form of an estimation function expressing a volume which changes in the case that edges are deleted, and deleting edges, for example, in the case that they are parallel to surrounding surfaces, surfaces are small and/or edges are short.

Further, in "Simplification Envelopes" (by Cohen Jonathan, Amitabh Varshney, Dinesh Manocha, Greg Turk, Hans Weber, Pankai Agarwal, Frederick Brooks and William Wright, pp. 119–128 of Proceedings of SIGGRAPH 96 in Computer Graphics Proceedings, Annual Conference Series, 1996, ACM SIGGRAPH) is disclosed a method for generating models obtained by reducing an original polygon model by an error $\epsilon$ and enlarging it by the error E and reducing the number of data of the original polygon model such that an approximate polygon model lies between the enlarged and reduced models.

Further, in "Surface Simplification Using Quadric Error Metrics" (by Michael Garland and Paul S. Heckbert, Carnegie Mellon University, Proceedings of SIGGRAPH 97, 1997) is disclosed a method for reducing the number of three-dimensional shape data forming a triangular polygon model by converging two or more vertices (three-dimensional shape data) forming an edge or surface of the triangular polygon model to one vertex. In this method, a distance between the converged vertex due to edge shrinking or surface shrinking and the respective planes forming the original triangular polygon model influenced by the edge shrinking or surface shrinking is controlled as an error in the data reduction. The number of data is reduced within a specified permissible error range by performing such an edge shrinking or surface shrinking that this error lies within a specified permissible range.

In this method, specifically, when the edge shrinking is applied for one edge, the error estimation is executed for the other edges or surfaces of the polygon model that are to be influenced by the edge shrinking because the shrinking of the one edge changes edges and surfaces surrounding the one edge. After the error calculation is completed, the shrinking of the one edge is determined. This processing is repeated to reduce the number of the three-dimensional shape data within a predetermined permissible range.

Since the data reducing method disclosed in "Hierarchical Approximation of Three-Dimensional Polygon Models" only deletes edges based on evaluation values thereof, an error in the approximation of a model by the edge deletion cannot be estimated although the three-dimensional data of characteristic portions of a polygon model remain. Thus, this method is effective in the case of reducing the number of data of a polygon model for merely displaying a three-dimensional image such as virtual reality and games in computer graphics. However, this method cannot be effective in the case that the error between the original measurement data and the data of the approximated model after the data reduction needs to be controlled.

On the other hand, the data reducing method disclosed in "Simplification Envelopes" can strictly control such error. However, it is necessary to generate polygon models by enlarging and reducing the original polygon model by an error $\epsilon$ and save the data of these polygon models during the data reduction. Thus, the number of data relating to the processing becomes huge, causing the problem of large burden on the memory capacity and calculations for the data reduction.

Further, the method disclosed in "Surface Simplification Using Quadric Error Metrics" controls the distances from the vertices of the polygon model after the approximation from the surfaces forming the original polygon model as errors. Thus, this method is not necessarily a suitable method in the case that data reduction is desired to be performed by controlling errors of the polygon models after the approximation from the vertices forming the original polygon model like the measurement data of the three-dimensional shape measuring apparatus.

Further, in the case of measurement data obtained by measuring rough surfaces or cut surfaces of a measurement object by means of a three-dimensional shape measuring apparatus, e.g., in the case that the orientation of surfaces locally suddenly change in a zigzag manner in a polygon model, errors for these zigzag surfaces are estimated. Therefore, errors are estimated as large values as the data reduction progresses, thereby presenting the problem of insufficient data reduction.

Furthermore, each time the edge or surface shrinking is performed, it is necessary to estimate errors with respect to the edges or surfaces of the shrunk polygon model that are to be influenced by the edge or surface shrinking. This will increase the number of calculations, consequently causing the problem of hindering the data reduction.

SUMMARY OF THE INVENTION

It is an object of the present invention to provide a method and apparatus for reducing three-dimensional shape data which are free from the problems residing in the prior art.

It is another object of the present invention to provide a three-dimensional shape data reducing method and apparatus which enable higher speed processing.

It is another object of the present invention is to provide a three-dimensional shape data reducing method and apparatus which enable proper data reduction based on precise error estimation for measurement data obtained by a three-dimensional shape measuring apparatus.

According to an aspect of the invention, a method for reducing three-dimensional shape data, comprises calculating estimation values for portions to be deformed by converging two or more vertices of a polygon model, and reducing the number of data for the polygon model by converging two or more vertices of the polygon model when the estimation values are equal to or below the predetermined permissible value.

The portions to be deformed may be surfaces of the polygon model. Estimation values for surfaces to be deformed by shrinking edges or surfaces may be calculated based on distances between the respective surfaces and all the original vertices involved in the surface deformation.

Alternatively, the number of data for the polygon model may be reduced by converging two or more vertices of one portion of the polygon model after another portion, repeatedly. Before each data reduction, the portion having been involved in all the previous data reductions is defined as a reduction prohibition area, and a succeeding data reduction is applied to a portion other than the reduction prohibition area.

According to another aspect of the invention, an apparatus for reducing three-dimensional shape data, comprises an estimation value calculator for calculating estimation values for portions to be deformed by converging two or more vertices of a polygon model, and a data reducing device for reducing the number of data for the polygon model by converging two or more vertices of the polygon model when the estimation values are equal to or below the predetermined permissible value.

The estimation value calculator may calculate estimation values for surfaces to be deformed by shrinking edges or surfaces based on distances between the respective surfaces and all the original vertices involved in the surface deformation.

Also, the data reducing device may reduce the number of data for the polygon model by converging two or more vertices of one portion of the polygon model after another portion, repeatedly. Further, there may be provided a judging device for judging based on a calculated estimated value whether a portion of the polygon model is permissible for the deformation, and a prohibition area defining device for defining a portion having been involved in all the previous data reductions executed by the data reducing device as a prohibition area to keep a succeeding data reduction from being applied.

These and other objects, features and advantages of the present invention will become more apparent upon a reading of the following detailed description and accompanying drawings.

DETAILED DESCRIPTION OF THE PREFERRED EMBODIMENTS OF THE INVENTION

Figure 1:
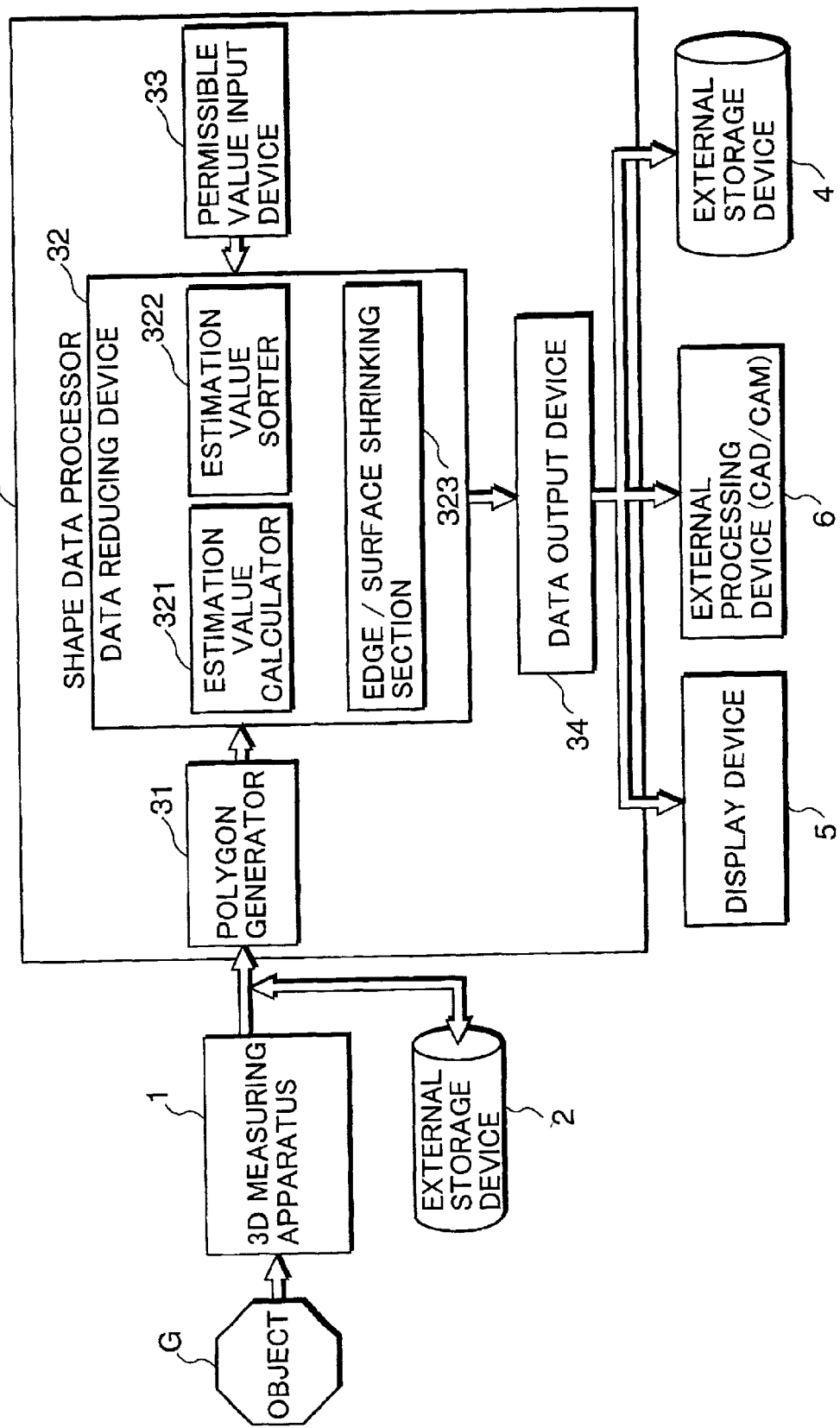
FIG. 1 is a block diagram showing a construction of a three-dimensional shape measurement data processing system according to an embodiment of the invention.

Referring to FIG. 1, a three-dimensional shape measurement data processing system (hereinafter, "shape data processing system") is provided with a three-dimensional shape measuring apparatus 1 for obtaining three-dimensional shape data of a measurement object G to be measured, an external storage device 2 for storing three-dimensional shape data obtained by the three-dimensional shape measuring apparatus 1, a shape data processor 3 for reducing the three-dimensional shape data obtained by the three-dimensional shape measuring apparatus 1 by a data reducing method to perform a specified data processing, an external storage device 4 for storing the three-dimensional shape data processed by the shape data processor 3, a display device 5 for displaying a three-dimensional image of the measurement object G such as a polygon model using the three-dimensional shape data after data reduction, and an external processing device 6 such as a CAD/CAM (computer aided design and computer aided manufacturing) device in which the three-dimensional shape data processed by the shape data processor 3 are utilized.

Figure 2:
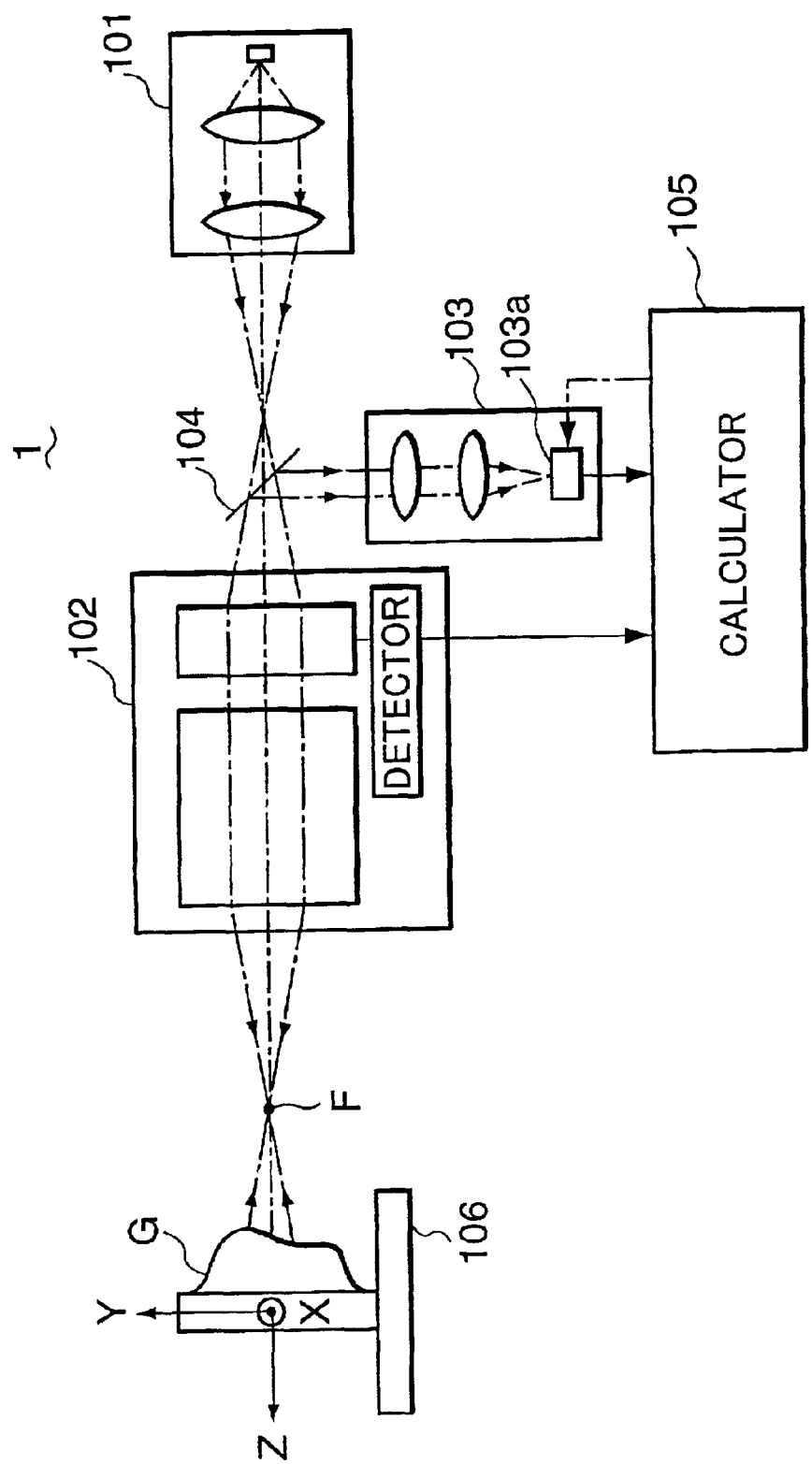
FIG. 2 is a block diagram showing a construction of a shape data processor.

The three-dimensional shape measuring apparatus 1 measures a surface shape of the measurement object G using a conjugated autofocus system. As shown in FIG. 2, the three-dimensional shape measuring apparatus 1 basically includes an illuminating unit 101 for generating illumination light, a confocal optical system 102 for projecting illumination light from the illuminating unit 101 onto the measurement object G and introducing the illumination light reflected by the measurement object G to a photodetector 103, and the photodetector 103 for receiving the illumination light reflected by the measurement object G and outputting it after photoelectrically converting it into an electrical signal, and a beam splitter 104 for splitting the light reflected by the measurement object G and having transmitted through the confocal optical system 102 (hereinafter, referred to as merely "optical system 102 "), and a calculator 105 for calculating coordinates of surface positions of the measurement object G using light reception signals outputted from the photodetector 103.

The three-dimensional shape of the measurement object G is measured by placing the measurement object G on a measurement table 106 provided in front of the three-dimensional shape measuring apparatus 1 and measuring the surface shape of the measurement object G at each height position while elevating and lowering the measurement table 106 at specified intervals along height direction. Specifically, assuming that Y-, Z- and X-directions denote the height direction of the measurement object G, the optical axis direction of the optical system 102 and a direction normal to Y-direction and Z-direction, respectively, the three-dimensional shape of the measurement object G is measured by measuring Z-coordinate of the measurement object G at each Y-coordinate while changing the Y-coordinate of the measurement object G at specified intervals. The three-dimensional shape data (x, y, z) of the measurement object G measured by the three-dimensional shape measuring apparatus 1 are inputted to the shape data processor 3.

The three-dimensional shape measuring apparatus 1 is provided with a photoelectrically converting device 103a arranged in parallel to X-axis and formed of a line sensor, and the coordinate (Z-coordinate) of a surface position of the measurement object G is measured using a light reception signal for each pixel (each pixel position corresponds to an X-coordinate) of the photoelectrically converting device 103a. An illumination light in the form of a slit extending in X-direction is emitted from the illuminating unit 101 so that the light reflected by the measurement object G is incident on the entire photoelectrically converting device 103a.

The Z-coordinates of the measurement object G are measured as follows. First, illumination light in the form of the slit extending in X-direction is emitted from the illuminating unit 101 provided at an image-side focusing position of the optical system 102. This illumination light is gathered at an object-side focusing position of the optical system 102 to form a line beam extending in X-direction at this focusing position. Subsequently, the photoelectrically converting device 103a is repeatedly exposed in a specific cycle while the object-side focusing position (i.e., line beam) of the optical system 102 is moved in the optical axis direction until this focusing position reaches the inside of the measurement object G. An exposure position where the level of the light reception signal is at maximum is calculated by the calculator 105 for each pixel of the photoelectrically converting device 103a using the levels of the light reception signals obtained at the each exposure position, and this position is assumed to be the Z-coordinate of the outer surface of the measurement object G.

Figure 3:
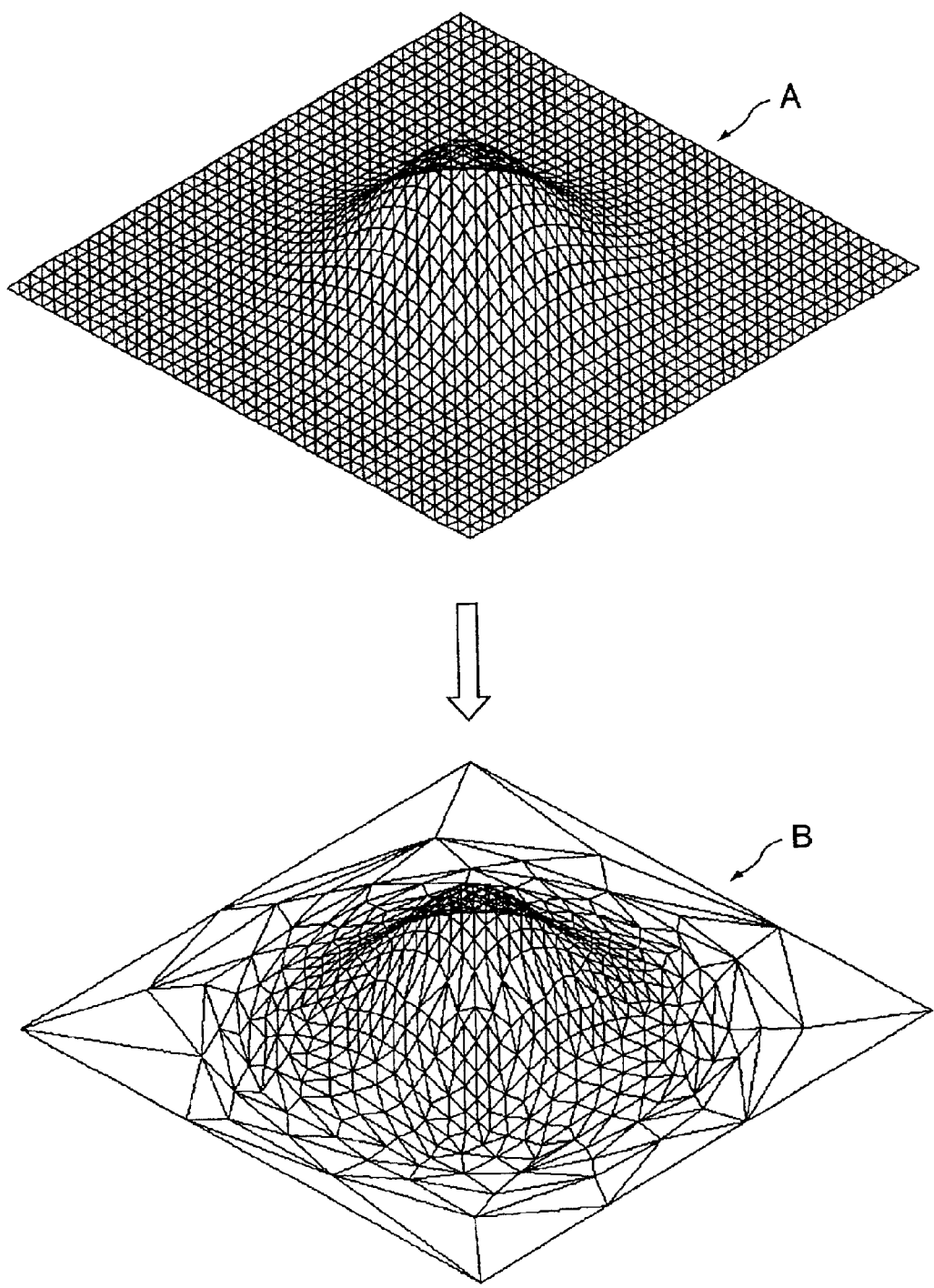
FIG. 3 is a diagram showing an example of approximation of a polygon model by data reduction.

The shape data processor 3 is provided with a polygon generator 31, a data reducing device 32, a permissible value input device 33 and a data output device 34. The polygon generator 31 generates a polygon model of the measurement object G based on the three-dimensional shape data (x, y, z) of the measurement object G inputted from the three-dimensional shape measuring apparatus 1. The data reducing device 32 reduces the three-dimensional shape data by edge shrinking or surface shrinking of the polygon model. In other words, as shown in FIG. 3, a precise polygon model A based on the measurement data is approximated to a polygon model B within a specified permissible error range by suitably reducing the vertices (three-dimensional shape data) of the polygon.

The data reducing device 32 includes an estimation value calculator 321, a estimation value sorter 322 and an edge/surface shrinking section 323 to carry out a data reduction processing to be described later.

The estimation value calculator 321 calculates estimation values used to judge whether the respective edges or surfaces can be shrunk before shrinking edges or surfaces forming the polygon model by converging two or more vertices to one vertex. This estimation value is described later.

The estimation value sorter 322 includes a calculator for calculating a minimum estimation value by rearranging a plurality of estimation values calculated for the respective edges or surfaces by the estimation value calculator 321 in an increasing or decreasing order. The edge/surface shrinking section 323 compares the minimum estimation value calculated by the calculator of the estimation value sorter 322 with a permissible value inputted via the permissible value input device 33 and performs an edge or surface shrinking corresponding to the minimum estimation value when the minimum estimation value is equal to or below the permissible value. The estimation values and an edge shrinking method are described later.

The permissible value input device 33 is operated by an operator to input the permissible value used to judge whether the edges or surfaces can be shrunk as described above. This permissible value corresponds to a permissible range within which the edge or surface shrinking is assumed to have a little influence on characterizing portion(s) of the polygon model in approximating the polygon model, and is suitably inputted by the operator according to the shape of the measurement object G.

The data output device 314 is an interface for outputting the reduced three-dimensional shape data (three-dimensional shape data forming the approximated polygon data) to the external storage device 4, the display device 5 and the external processing device 6.

At least part of devices of the shape data processor 3 may be provided in another independent processing unit, and their functions may be realized by cooperation of the processing units and the shape data processor 3. Alternatively, these devices may be processing units which are separately provided in the shape data processor 3 and cooperate with each other. Conversely, at least two functions of these devices may be realized by a processing program of one processor, e.g., the shape data processor 3 or a processor provided therein.

The external storage device 4 is adapted to store the data in an external storage medium such as a magnetic disk, an optical disk or a magnetooptical disk. Upon input of the three-dimensional shape data from the shape data processor 3, the external storage device 4 stores the data in an external storage medium in a specified file format.

The display device 5 is an electronic display device such as a cathode-ray tube or a liquid crystal display device. Upon input of the three-dimensional shape data from the shape data processor 3, an image of the approximated polygon model of the measurement object G is displayed on the display device 5 based on the inputted data (see the polygon model B of FIG. 3).

The external processing device 6 is a device for fabricating, for example, a mold or a model having substantially the same configuration as the surface configuration of the measurement object G. Upon input of the three-dimensional shape data from the shape data processor 3, a mold or the like is automatically fabricated by cutting a work based on the inputted three-dimensional shape data.

Referring back to FIG. 1, at least part of the measuring apparatus 1 and the devices 2, 4, 5, 6 may be incorporated in the shape data processor 3.

Figure 4:
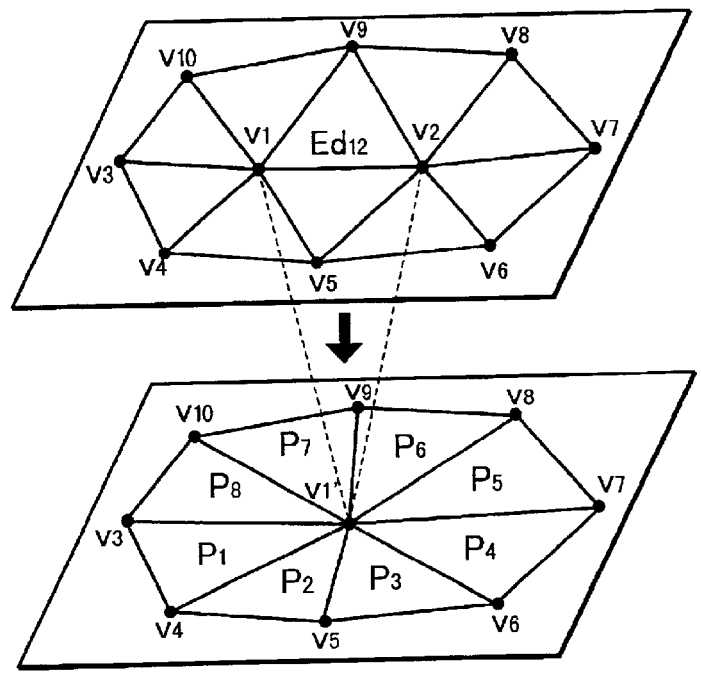
FIG. 4 is a concept diagram showing a data reducing method by edge shrinking.
Figure 5:
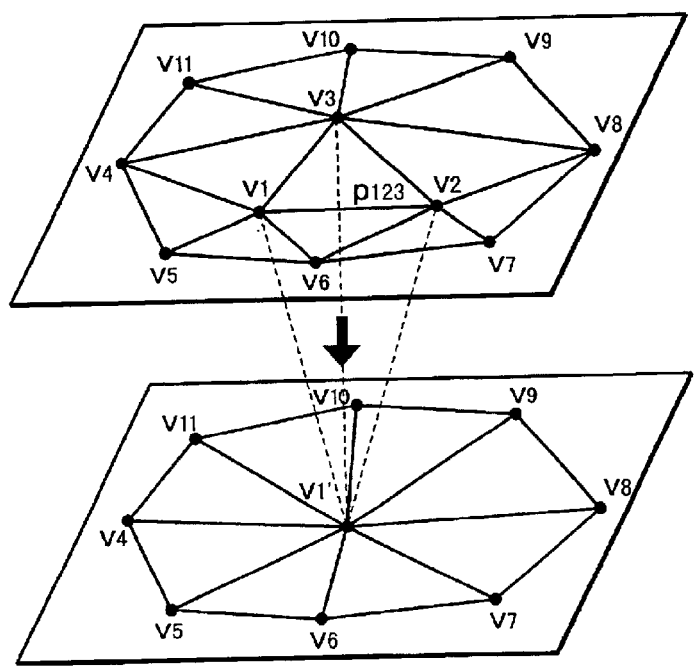
FIG. 5 is a concept diagram showing a data reducing method by surface shrinking.

Referring to FIGS. 4 and 5, next, the data reducing method will be described. The data reducing method by edge shrinking is such a method for reducing the number of data that, in the case that a polygon model is defined by vertices $v_1$ to $v_{10}$ as shown in FIG. 4, two vertices $v_1$, $v_2$ are, for example, so converged to a vertex $v_1'$ as to shrink an edge $Ed_{12}$ connecting the vertices $v_1$, $v_2$.

In the data reducing method by edge shrinking (hereinafter, referred to as "edge shrinking method"), estimation values for estimating the influence of the edge shrinking on a change of the configuration of the polygon model for all edges $Ed_{ij}$ (i, j=1, 2, ... 10, combinations of vertices adjacent to each other when i≠j) are first calculated, and the vertices $v_i$, $v_j$ at the opposite ends of the edge $Ed_{ij}$ corresponding to a minimum estimation value are converged to a specified vertex $v_i'$ for data reduction if the minimum estimation value is equal to or below a permissible value.

Subsequently, the edge shrinking is performed in a similar manner for the polygon model (approximated polygon model) in which the vertices $v_i$, $v_j$ are converted to the vertex $v_i'$, thereby further reducing the data. Thereafter, the edge shrinking is performed edge by edge in a similar method until no more edge shrinking can be performed for the polygon model after edge shrinking (i.e., the approximation of the polygon model is repeated until the minimum estimation value becomes larger than the permissible value) to reduce the data.

It should be noted that the vertex $v_i'$ is an approximated point set in a specified position between the vertices $v_i$, $v_j$ such as a middle point of the edge $Ed_{ij}$ as disclosed in the aforementioned paper "Hierarchical Approximation of Three-Dimensional Polygon Models".

The data reducing method by surface shrinking (hereinafter, referred to as merely "surface shrinking method") is such a method for reducing the number of data that, in the case that a polygon model is defined by vertices $v_1$ to $v_{11}$ as shown in FIG. 5, vertices $v_1$, $V_2$, $v_3$ are so converged to a vertex $v_1'$ as to delete a surface $P_{123}$ enclosed by the vertices $v_1$, $V_2$, $V_3$.

Basically, the data reducing method by surface shrinking is carried out in a procedure similar to that of the data reducing method by edge shrinking. Specifically, estimation values for estimating the influence of the surface shrinking on a change of the configuration of the polygon model for all surfaces $P_{ijk}$ (i, j, k=1, 2, ... 10, combinations of vertices adjacent to each other when i≠j≠k) are first calculated, and the vertices $v_i$, $v_j$, $v_k$ defining the surface $P_{ijk}$ corresponding to a minimum estimation value are converged to a specified vertex $v_i'$ for data reduction if the minimum estimation value is equal to or below a permissible value. Thereafter, the surface shrinking is performed surface by surface in a similar method until no more surface shrinking can be performed for the polygon model after surface shrinking to reduce the data.

In the case that the three-dimensional shape data are successively reduced by the edge reducing method or surface reducing method, the three-dimensional shape data forming the measurement object G after the data reduction processing are different from those of the measurement object G actually measured by the three-dimensional shape measuring apparatus 1 and serve as approximated three-dimensional shape data. Thus, it is necessary to perform the data reduction processing while controlling an error of the polygon model after the data reduction (hereinafter, referred to as "approximated polygon model") from the polygon model formed by the actually measured three-dimensional shape data (hereinafter, referred to as "original polygon model").

Figure 6:
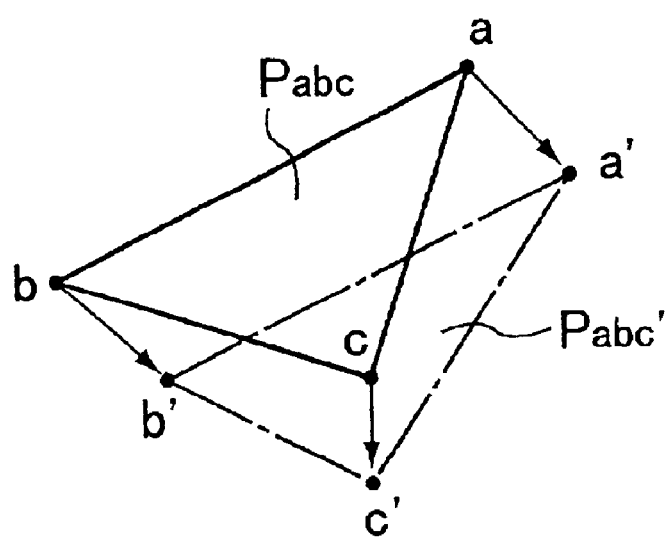
FIG. 6 is a diagram showing an estimation value used in a data reducing method according to the embodiment.

In the data reducing method according to this embodiment, if it is assumed that a triangular polygon $P_{abc}$ is approximated to a triangular polygon $P_{abc}'$ by, for example, approximating vertices a, b, c (actually measured three-dimensional shape data) to vertices a', b', c' as shown in FIG. 6 through, for example, repetition of the edge shrinking, distances of a surface including the triangular polygon $P_{abc}'$ after the approximation from the original vertices a, b, c involved in the approximation of this surface are controlled as errors.

In the example of FIG. 6, the vertices involved in the approximation are assumed to be the vertices a, b, c in order to simplify the description. However, in an actual processing, vertices other than the vertex a are involved in the approximation, for example, while the vertex a is converged to the vertex a'. Therefore, the above errors include distances of these vertices from the triangular polygon $P_{abc}'$.

Next, the estimation value of the error used in the data reducing method according to this embodiment is described. Generally, a surface p in a three-dimensional space is expressed by Equation (1):

$$A \cdot x + B \cdot y + C \cdot z + D = 0 \quad (1)$$

where $$A^2 + B^2 + C^2 = 1.$$

On the other hand, if ($v_x$, $v_y$, $v_z$) denotes the coordinates of point v in the three-dimensional space, a distance d between the point v and a surface p is calculated by Equation (2):

$$d = A \cdot v_x + B \cdot v_y C \cdot v_z + D \quad (2)$$

and can also be expressed by matrices as in Equation (3):

$$d = P^T \cdot V \quad (3)$$

where $$P = \begin{bmatrix} a \\ b \\ c \\ d \end{bmatrix} \quad V = \begin{bmatrix} v_x \\ v_y \\ v_z \\ 1 \end{bmatrix}$$

$P^T$ is a transposed matrix of P.

Accordingly, the square of the distance d is expressed by Equation (4):

$$d^2 = (P^T \cdot V)^2 = (P^T 19\ V) \cdot (V^T \cdot P) = P^T \cdot (V \cdot V^T) \cdot P = P^T \cdot Kv \cdot P \quad (4)$$

where $V^T$ is a transposed matrix of V $$Kv = V \cdot V^T = \begin{bmatrix} v_x^2 & v_x v_y & v_x v_z & v_x \\ v_x v_y & v_y^2 & v_y v_z & v_y \\ v_x v_z & v_y v_z & v_z^2 & v_z \\ v_x & v_y & v_z & 1 \end{bmatrix}$$

Equation (4) expresses the square of the distance d between one plane p and one point v not included in the plane p. In the case that a plurality of such points $V_1, v_2, \ldots v_m$ exist for the plane p, a sum $\Delta(p)$ of the squares of these points $V_i$ (i=1, 2, . . . m) from the plane p is expressed by Equation (5):

$$\Delta(p) = \sum_{i=1}^{m} d_i^2 = \sum_{i=1}^{m} (P^T \cdot Kv_i \cdot P) = P^T \cdot \sum_{i=1}^{m} Kv_i \cdot P \quad (5)$$

In the data reducing method according to this embodiment, if there are n planes of a polygon model which are influenced by the edge shrinking, for example, when data are reduced by edge shrinking, distances of a plurality of original vertices (original three-dimensional shape data) involved in the data reduction processing for the approximation from the planes are estimated for all such planes. Accordingly, the sum $\Delta(p)$ of the squares of the distances is calculated by Equation (5) for each of such planes, and $\epsilon$ which is obtained by dividing a sum of the sums $\Delta(p_i)$ by a total number M of all vertices involved in the data reduction processing as seen in Equation (6) is assumed as an error estimation value:

$$\varepsilon = \frac{\sum_{i=1}^{n} \Delta(p_i)}{M} = \frac{\sum_{i=1}^{n} \Delta(P_i)}{\sum_{i=1}^{n} m_i} \quad (6)$$

Further, Equation (7) is obtained by substituting $$P^T \cdot \sum_{i=1}^{m} Kv_i \cdot P$$

of Equation (5) for $\Delta(P_i)$ in Equation (6):

$$\varepsilon = \frac{\sum_{i=1}^{n} \left( P_i^T \cdot \sum_{j=1}^{m_i} Kv_j \cdot P_i \right)}{\sum_{i=1}^{n} m_i} \quad (7)$$

It should be noted that in Equation (7),
$P_i$ denotes a column vector for an equation of a plane $p_i$ subject to the deformation;
$P_i^T$ denotes an inverse matrix of $P_i$;
$Kv_j$ denotes an error matrix for a j-th vertex $v_j$ involved in the deformation of the plane $p_i$ when an error matrix for data of an original vertex v involved in the deformation of the plane $p_i$, is defined by $Kv=V \cdot V^T$ (V denotes a column vector for the data);
$m_i$ denotes a sum of error matrix $Kv_j$ for a vertex $v_j$ involved in only the deformation of the i-th plane $p_i$; and
n denotes a sum of planes $p_i$ to be deformed.
In Equation (6), $\Delta(p_i)$ is a sum of the squares of all original vertices involved in the approximation of the i-th plane $p_i$ from the plane $p_i$, and $m_i$ is the number of terms in the sum of the squares of the distances.

In the calculation by Equation (6), since a matrix $Kv_i$ is a symmetric matrix as shown in Equation (4), only diagonal elements and elements above them may be stored in the memory for the matrix $Kv_i$ calculated for the original vertex $v_i$. This enables a memory capacity necessary for the calculation to be reduced. Further, the respective terms $m_i$ in the denominator of Equation (6) are the number of terms of the sum of the squares of the distances in the i-th approximated plane $p_i$. Since the element at the right bottom corner of the matrix Kv is constantly "1" and the element at the right bottom corner of a matrix $\Sigma Kv$ in the calculation of the sum of the squares of the distances is $m_i$, calculation by Equation (6) may be conducted using the value of this element. Thus, the calculation is easier because it is not necessary to separately calculate the number of terms $m_i$.

Further, it may be appreciated to use weighted error matrix for the calculation of the error $\epsilon$. Specifically, there are provided a weight factor $w_i$ for each vertex $V_i$ in consideration of the influence of the vertex $V_i$ to an approximated polygon model or other causes. The weighted error matrix is obtained by multiplying the error matrix $Kv_i$ for the vertex $V_i$ by a predetermined weight factor $w_i$ for the vertex $V_i$ as $w_i \cdot Kv_i$.

In the case that Equation (5) is applied in estimating an error for a certain plane p, if original vertices $v_i$ involved in the processing of edge shrinking or surface shrinking for the plane p are specified, a sum $\Sigma Kv_i$ of the matrices $Kv_i$ obtained by the three-dimensional shape data of these vertices $v_i$ serves as a parameter indicating a degree of the error in the edge shrinking or surface shrinking. In the description below, $\Sigma Kv_i$ is referred to as an error matrix.

Next, a procedure of the three-dimensional shape data reduction processing is described with reference to FIG. 7. The three-dimensional shape data of the measurement object G obtained by the three-dimensional shape measuring apparatus 1 are inputted to the shape data processor 3, in which a triangular polygon model is generated in the polygon generator 31 (Step #1). Further, an operator inputs a permissible value used to judge whether the edge shrinking processing can be performed via the permissible value input device 33 (Step #3).

Subsequently, estimation values $\epsilon_j$ (j=1, 2, . . . N, N is a total number of edges) in the case that all edges of the original polygon model are shrunk are calculated by Equation (6) in the estimation value calculator 321 (Step #5). For instance, in the example of FIG. 4, estimation values $\epsilon_j$ (j=1, 2, . . . 19) in the case of shrinking the edges $Ed_{1r}$ (r=2 to 5, 9, 10), $Ed_{2s}$ (s=5, 6, . . . 9) and $Ed_{tt+1}$ (t=3, 4, . . . 10, where t+1=11 is assumed to be t+1=3) are calculated.

At this time, if the edge $Ed_{12}$ is shrunk by, for example, converging the vertices $v_1, v_2$ to the vertex $v_1'$, the original planes are all deformed and eight planes $p_1, p_2, \ldots p_{10}$ (hereinafter, planes after the deformation are referred to as approximated planes) are formed by the vertex $v_1'$ and the vertices $v_3$ to $v_{10}$ not involved in the edge shrinking. A sum of the squares of the distances $\Delta(p_k)$ (k=1, 2, . . . 8) are calculated for each of these approximated planes $p_k$, a total number M of the elements included in all the sums $\Delta(p_k)$ is calculated, and an evaluation value $\epsilon(Ed_{12})$ in the shrinking of the edge $Ed_{12}$ is calculated by Equation (6). The evaluation value $\epsilon(Ed_{12})$ is expressed by Equation (8):

$$\varepsilon(Ed_{12}) = \frac{\{\Delta(p_1) + \Delta(p_2) + \cdots + \Delta(p_8)\}}{(m_1 + m_2 + \cdots + m_8)} \qquad (8)$$

At this time, the plane $p_1$ is defined by the vertices $v_1'$, $v_3$, $v_4$. Since the vertices involved in the edge shrinking are only $v_1$, $v_2$ if the vertices $v_1$, $v_2$, $v_3$, $v_4$ are actually measured data, the sum $\Delta(p_1)$ of the squares of the distances is calculated by Equation (5) using an error matrix $(Kv_1 + Kv_2)$ relating to these vertices $v_1$, $v_2$. If, in this state, the vertex $v_1'$ and another vertex $v_m$ (unillustrated actually measured data) are converged to a vertex $v_1'$ (not shown) to approximate the approximated plane $p_1'$ further to an approximated plane $p_1'$ (not shown), the vertices involved in the edge shrinking leading to the approximated plane $p_1'$ are $v_1$, $v_2$, $v_m$. Thus, a sum $\Delta(p_1')$ of the squares of the distances is calculated by Equation (5) using an error matrix $(Kv_1 + Kv_2 + Kv_m)$ relating to these vertices $v_1$, $v_2$, $v_m$.

In the second edge shrinking, it is assumed that an error matrix $Kv_1'$ for the vertex $v_1'$ is $(Kv_1 + Kv_2)$, and the sum $\Delta(p_1')$ of the squares of the distances is calculated by Equation (5) using the error matrix $Kv_1'$ for the vertex $v_1'$ and an error matrix $Kv_m$ for the vertex $v_m$.

Accordingly, a general theory of the edge shrinking processing is as follows. If the vertices $v_1$, $v_2$, $v_3$, $v_4$ are data generated by the edge shrinking instead of being actually measured data in FIG. 4, the error matrix $Kv_1'$ for the vertex $v_1'$ defining the approximated plane $p_1$ is $Kv_1' = Kv_1 + Kv_2$ when the error matrices for the respective vertices $v_1$, $v_2$, $v_3$, $v_4$ are assumed to be $Kv_1$, $Kv_2$, $Kv_3$, $Kv_4$. The sum $\Delta(p_1)$ of the squares of the distances is calculated by Equation (5) using an error matrix $K_{p1}$ $(=Kv_1' + Kv_3 + Kv_4 = Kv_1 + Kv_2 + Kv_3 + Kv_4)$ obtained by adding the error matrices $Kv_1'$, $Kv_3$, $Kv_4$ for the three vertex $v_1'$, $v_3$, $v_4$ defining the approximated plane $p_1$.

An equation used to calculate the sum $\Delta(p_1)$ of the squares of the distances is:

$$\Delta(p_1) = P_1^T \cdot K_{p1} P_1 \qquad (9)$$

Here, $P_1$ is a column vector of the approximated plane $p_1$ and $m_1$ is a total number of the error matrices $Kv$ included in the error matrix $K_{p1}$.

For the approximated planes $p_2$, $p_3$, ... $p_8$, sums $\Delta(p_2)$, $\Delta(p_3)$, ... $\Delta(p_8)$ of the squares of the distances are calculated by the same method as for the aforementioned approximated plane $p_1$, and are substituted into Equation (8) to calculate the error estimation value $\varepsilon(Ed_{12})$ in the shrinking of the edge $Ed_{12}$.

The error estimation values $\varepsilon(Ed_{1r})$, $\varepsilon(Ed_{2s})$, $\varepsilon(Ed_{n+1})$ in the case that the other edges $Ed_{1r}$, $Ed_{2s}$, $Ed_{n+1}$ are shrunk by the same method are calculated.

Subsequently, the error estimation values $\varepsilon_j$ are sorted in the estimation value sorter 322 (Step #7) and it is discriminated whether the minimum estimation value Min$\{\varepsilon_j\}$ is equal to or below the permissible value inputted in Step #3 (Step #9). If the minimum estimation value Min$\{\varepsilon_j\}$ exceeds the permissible value (NO in Step #9), the data reduction processing by the edge shrinking is completed since a change of the shape resulting from application of the edge shrinking to all the edges is impermissibly large. On the other hand, if the minimum estimation value Min$\{\varepsilon_j\}$ is equal to or below the permissible value (YES in Step #9), the edge corresponding to the minimum estimation value Min$\{\varepsilon_j\}$ is shrunk in the edge/surface shrinking section 323 (Step #11). For example, if the minimum estimation value Min$\{\varepsilon_j\}$ is $\varepsilon(Ed_{12})$ in FIG. 4, the edge $Ed_{12}$ is shrunk as shown in FIG. 4.

Subsequently, this routine returns to Step #7 after error estimation values $\varepsilon_q$ (q=1, 2, . . . ) are calculated for the edges of the polygon model after the edge shrinking that have been influenced by the edge shrinking (Step #13). A minimum estimation value Min$\{\varepsilon_q\}$ of these estimation values $\varepsilon_q$ is calculated and the edge corresponding thereto is shrunk (Steps #7 to #11). Thereafter, the edge shrinking is repeated edge by edge (loop of Steps #7 to #13), and the data reduction processing is completed when the minimum estimation value Min$\{\varepsilon_q\}$ exceeds the permissible value (NO in Step #9).

By performing the data reduction processing as above, the polygon model after the data reduction is approximated from the original polygon model such that the error estimation values from the original measurement data are equal to or below the permissible value.

As described above, in the data reduction method according to this embodiment, the distances of the planes of the polygon model approximated by the edge shrinking or surface shrinking from the original vertices (measured three-dimensional shape data) are treated as the error estimation values. Thus, the data reduction processing can be performed by the estimation standard intuitively easily understandable.

Further, since the data reduction is performed such that the evaluation values lie within the specified permissible error range, it can be performed at a high speed while relatively precisely controlling the errors of the three-dimensional shape data forming the polygon model after the approximation.

Particularly, reduction in the reliability of the error evaluation values can be suppressed even in the case that random noise data are mixed into the measured three-dimensional shape data or data reduction is performed by converging a multitude of vertices to one point.

Figure 8:
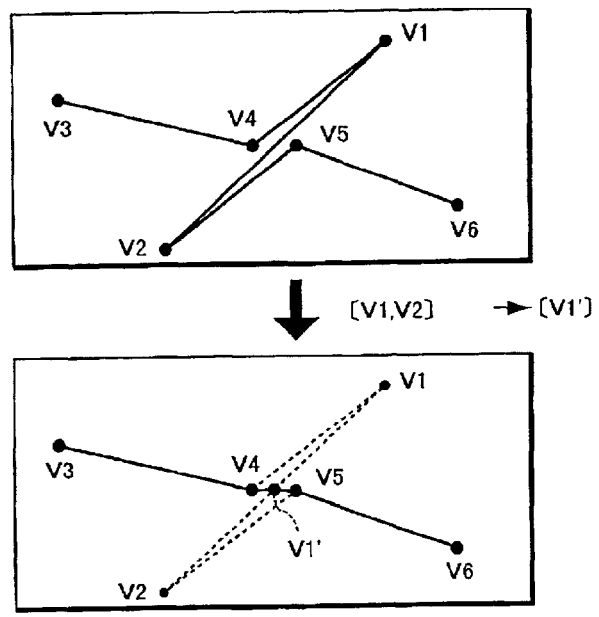
FIG. 8 is a diagram showing edge shrinking in a portion where a discontinuous surface is formed on a polygon model by a random noise data.
Figure 9:
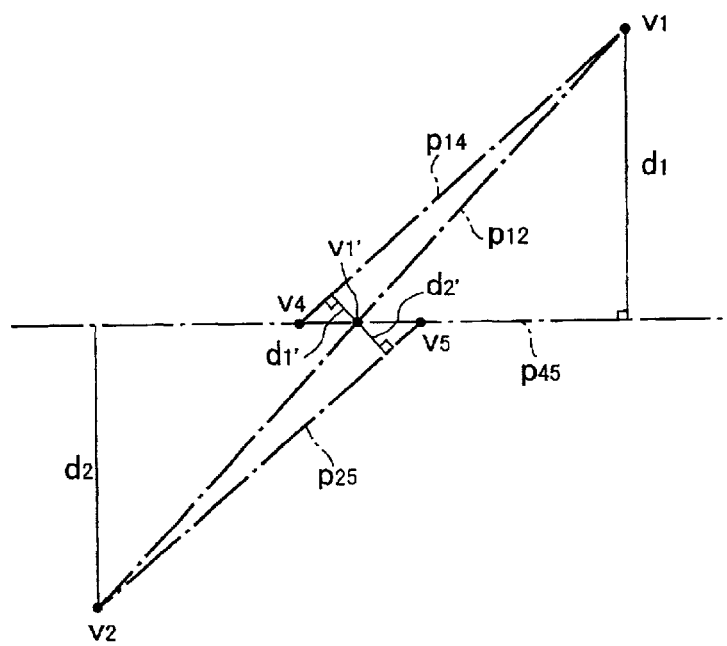
FIG. 9 is a diagram showing a difference between an error estimation value according to the embodiment and a conventional error estimation value in the data reduction shown in FIG. 8.

FIGS. 8 and 9 show a comparison of the error estimating method according to this embodiment and the conventional error estimating method in the case that random noise data are mixed into the measured three-dimensional shape data.

FIG. 8 shows the edge shrinking of a portion (shown in section) where discontinuous surfaces are created on a polygon model by random noise data. If vertices $v_1$, $v_2$ of the portion where large discontinuities are created on the outer surface of the polygon model are converged to a vertex $v_1'$ as shown in FIG. 8, error estimation is made based on, for example, distances $d_1'$, $d_2'$ of the vertex $v_1'$ to a plane $p_{14}$ including vertices $v_1$, $v_4$ and a plane $p_{25}$ including vertices $v_2$, $v_5$ as shown in FIG. 9 according to the data reducing method disclosed in the above paper "Surface Simplification Using Quadric Error Metrics". Thus, the calculated error estimation values are smaller than sensory approximation errors. Contrary to this, according to the data reducing method of this embodiment, error estimation is based on, for example, distances $d_1$, $d_2$ of the vertices $v_1$, $v_2$ to a plane $p_{45}$ including vertices $v_1'$, $v_4$ and $v_5$. Thus, the error estimation values relatively agree with the sensual approximation errors and are not calculated smaller than the latter.

Figure 10:
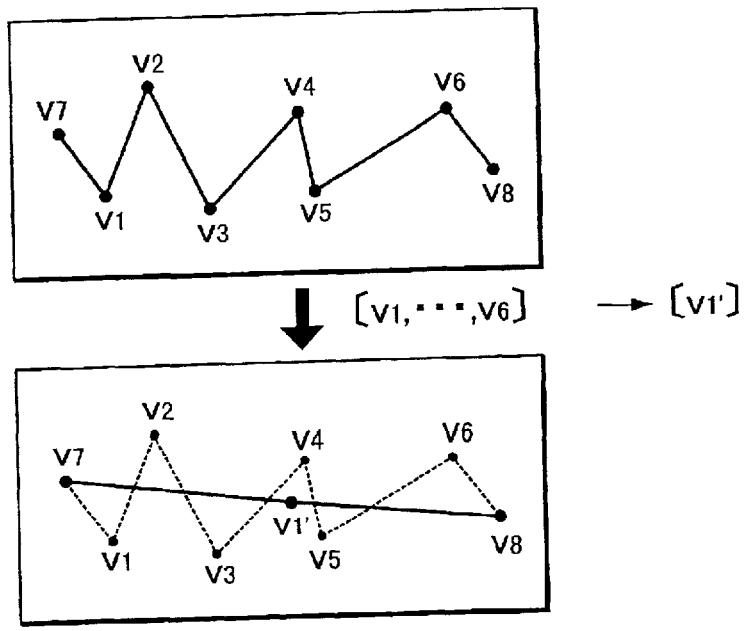
FIG. 10 is a diagram showing shrinking of a zigzag surface of a polygon model having such a surface.
Figure 11:
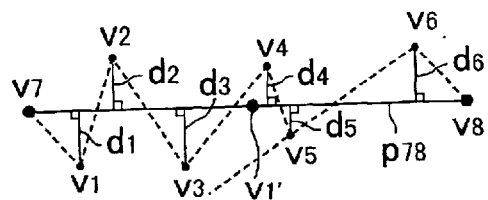
FIG. 11 is a diagram showing a conventional error estimation value in the data reduction shown in FIG. 10.
Figure 12:
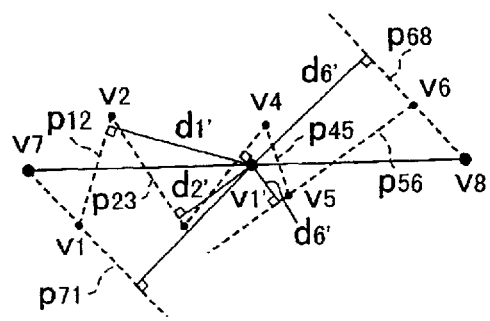
FIG. 12 is a diagram showing an error estimation value according to the embodiment in the data reduction shown in FIG. 10.

FIGS. 10, 11 and 12 show a comparison of the error estimating method according to this embodiment and the conventional error estimating method in the case that a multitude of vertices are converged to one point.

FIG. 10 shows the shrinking of a zigzag surface (shown in section) defined by eight vertices $v_1$, $v_2$, . . . $v_8$ of a polygon model. If the vertices $v_1$, $v_2$, . . . $v_6$ are converged to a vertex $v_1'$ located substantially in the middle between the vertices $v_7$ and $v_8$ as shown in FIG. 10, error estimation is made based on distances $d_1'$, $d_2'$, . . . $d_6'$ of the vertex $v_1'$ to the respective zigzag planes $p_{71}$, $p_{12}$, $p_{23}$, $p_{34}$, $p_{45}$, $p_{56}$, $p_{68}$ of the original polygon model as shown in FIG. 12 according to the data reducing method disclosed in the above paper "Surface Simplification Using Quadric Error Metrics". Thus, the calculated error estimation values are larger than sensory approximation errors. Contrary to this, according to the data reducing method of this embodiment, error estimation is based on, for example, distances $d_1$, $d_2$, ... $d_6$ of the respective vertex $v_1$, $v_2$, ... $v_6$ to the plane $p_{78}$ including the vertices $v_1'$, $v_7$, $v_8$ as shown in FIG. 11. Thus, the error estimation values relatively agree with the sensual approximation errors and are not calculated larger than the latter.

Figure 13:
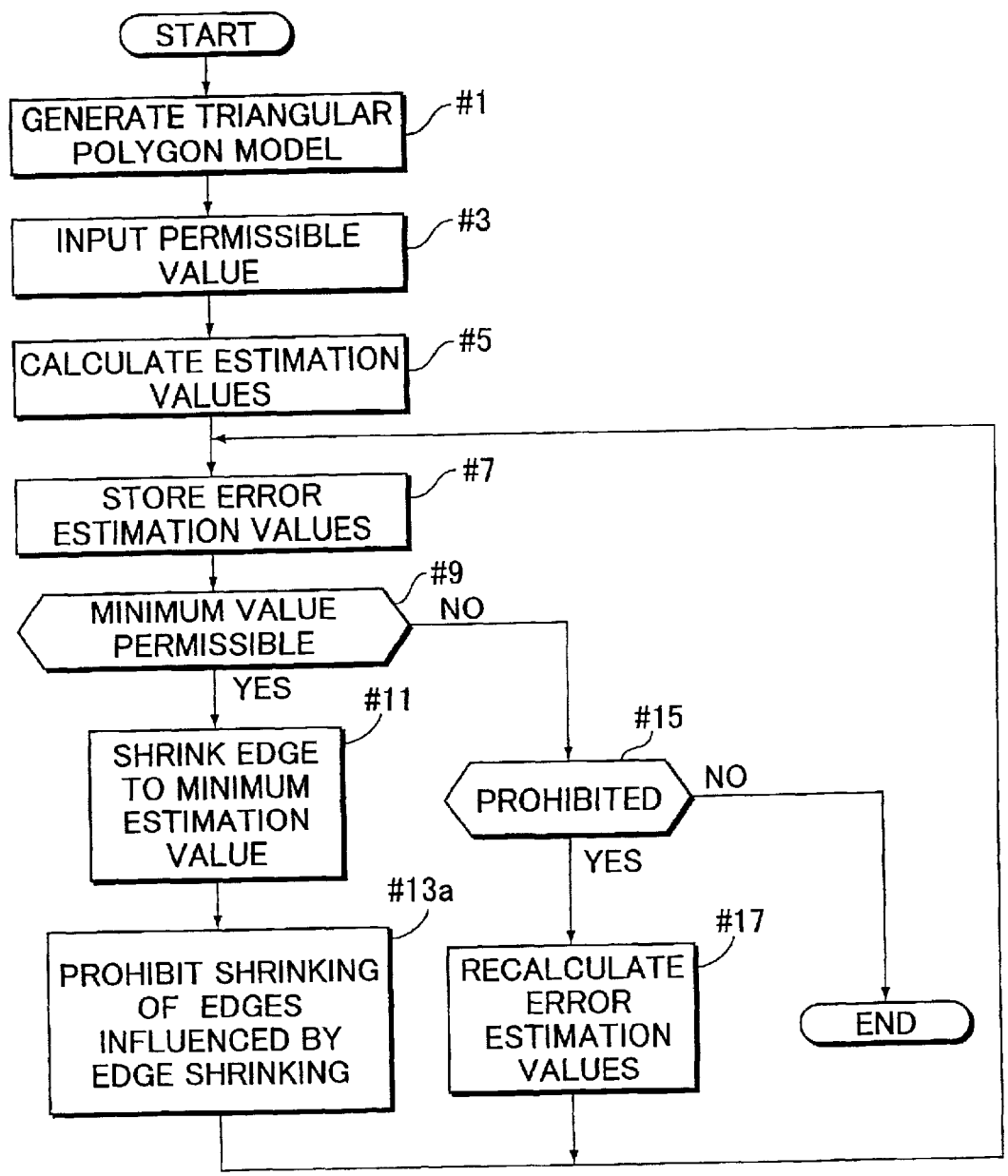
FIG. 13 is a flowchart showing another embodiment of the three-dimensional shape data reduction procedure.

FIG. 13 is a flowchart showing a modification of the procedure of the three-dimensional shape data reduction processing. In the procedure of the data reduction processing shown in FIG. 7, the estimation values $\epsilon$ are recalculated for the edges influenced by the edge shrinking every time the edge shrinking is performed, and a next edge shrinking is performed based on the estimation values $\epsilon$. However, in the procedure of the data reduction processing shown in FIG. 13, the edge shrinking is applied to edges other than those influenced by the edge shrinking without calculating the estimation values $\epsilon$ for the edges influenced by the edge shrinking.

Figure 7:
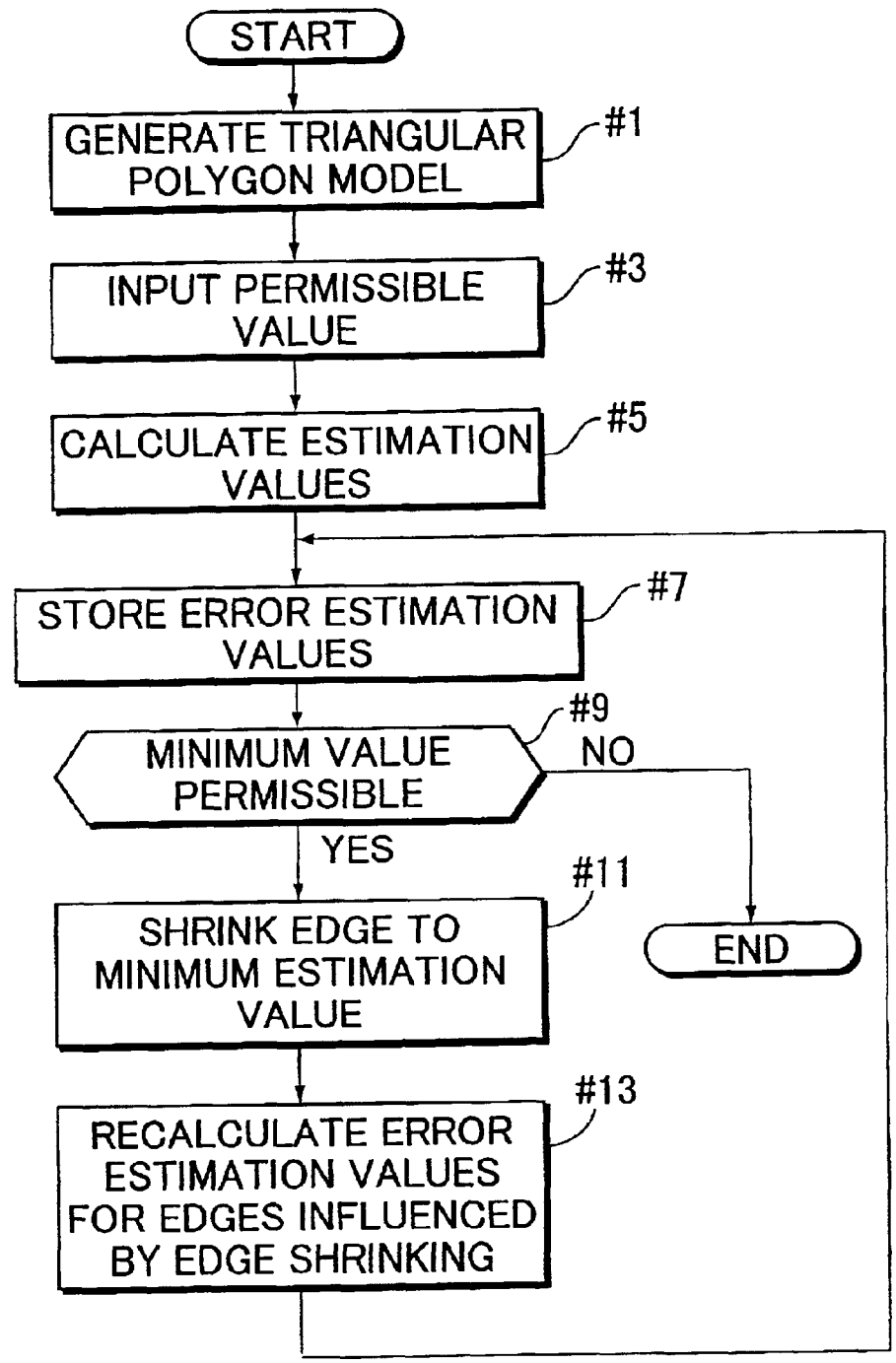
FIG. 7 is a flowchart showing a procedure of a three-dimensional shape data reduction processing.

Specifically, the flowchart of FIG. 13 differs from that of FIG. 7 in that the operation in Step #13 is changed to Step #13a in which shrinking of the edges influenced by the edge shrinking is prohibited, and Steps #15 and #17 are added between Step #9 and "END".

Accordingly, common part of the flowcharts is briefly described and only different part is described in detail below.

The three-dimensional shape data of the measurement object G obtained by the three-dimensional shape measuring apparatus 1 are inputted to the shape data processor 3, in which a triangular polygon model is generated in the polygon generator 31 (Step #1). Further, an operator inputs a permissible value used to judge whether the edge shrinking processing can be performed via the permissible value input device 33 (Step #3).

Subsequently, estimation values $\epsilon_j$ (j=1, 2, ... N, N is a total number of edges) in the case that all edges of the polygon model are shrunk are calculated in the estimation value calculator 321 (Step #5), and the error estimation values $\epsilon_j$ are sorted in the estimation value sorter 322 (Step #7).

Subsequently, it is discriminated whether the minimum estimation value Min$\{\epsilon_j\}$ is equal to or below the permissible value inputted in Step #3 (Step #9). If the minimum estimation value Min$\{\epsilon_j\}$ is equal to or below the permissible value (YES in Step #9), the edge corresponding to the minimum estimation value Min$\{\epsilon_j\}$ is shrunk in the edge/surface shrinking section 323 (Step #11).

Subsequently, application of the edge shrinking processing to the edges influenced by the previous edge shrinking processing is prohibited (Step #13a) and then Step #7 follows. This operation is made to apply a next edge shrinking processing to the edges not influenced by the edge shrinking processing this time.

Back in Step #7, estimation values $\epsilon_q$ (q=1, 2, ... Q where Q<N) corresponding to the edges except those for which the edge shrinking is prohibited are sorted, and a minimum estimation value Min$\{\epsilon_q\}$ is calculated. It is then discriminated whether the minimum estimation value Min$\{\epsilon_q\}$ is equal to or below the permissible value (Step #9). If the minimum estimation value Min$\{\epsilon_q\}$ is equal to or below the permissible value (YES in Step #9), the edge corresponding to the minimum estimation value Min$\{\epsilon_q\}$ is shrunk in the edge/surface shrinking section 323 (Step #11). Further, application of the edge shrinking processing to the edges influenced by the previous edge shrinking processing is prohibited (Step #13a) and then Step #7 follows.

Thereafter, by repeating the above operations, a next edge shrinking processing is performed while excluding the edges already influenced by the previous edge shrinking processing every time the edge shrinking processing is performed (loop of Steps #7, #9, #11, #13a).

On the other hand, if the minimum estimation value Min$\{\epsilon_q\}$ becomes larger than the permissible value (NO in Step #9) while the edge shrinking processing is repeated, it is discriminated whether the edge shrinking has been prohibited for these edges (Step #15). If the discrimination result is affirmative (YES in Step #15), Step #7 follows after error estimation values $\epsilon_r$ (r=1, 2, ... ) are recalculated for these edges (Step #17). A minimum estimation value Min$\{\epsilon_r\}$ of the error estimation values $\epsilon_r$ are calculated, and the edge corresponding to the minimum estimation value Min$\{\epsilon_r\}$ is shrunk (Steps #7, #9, #11).

If the minimum estimation value Min$\{\epsilon_q\}$ becomes larger than the permissible value and there is no more edge for which the edge shrinking is prohibited (NO in Steps #9, #15), the data reduction processing by the edge shrinking is completed.

Figure 14:
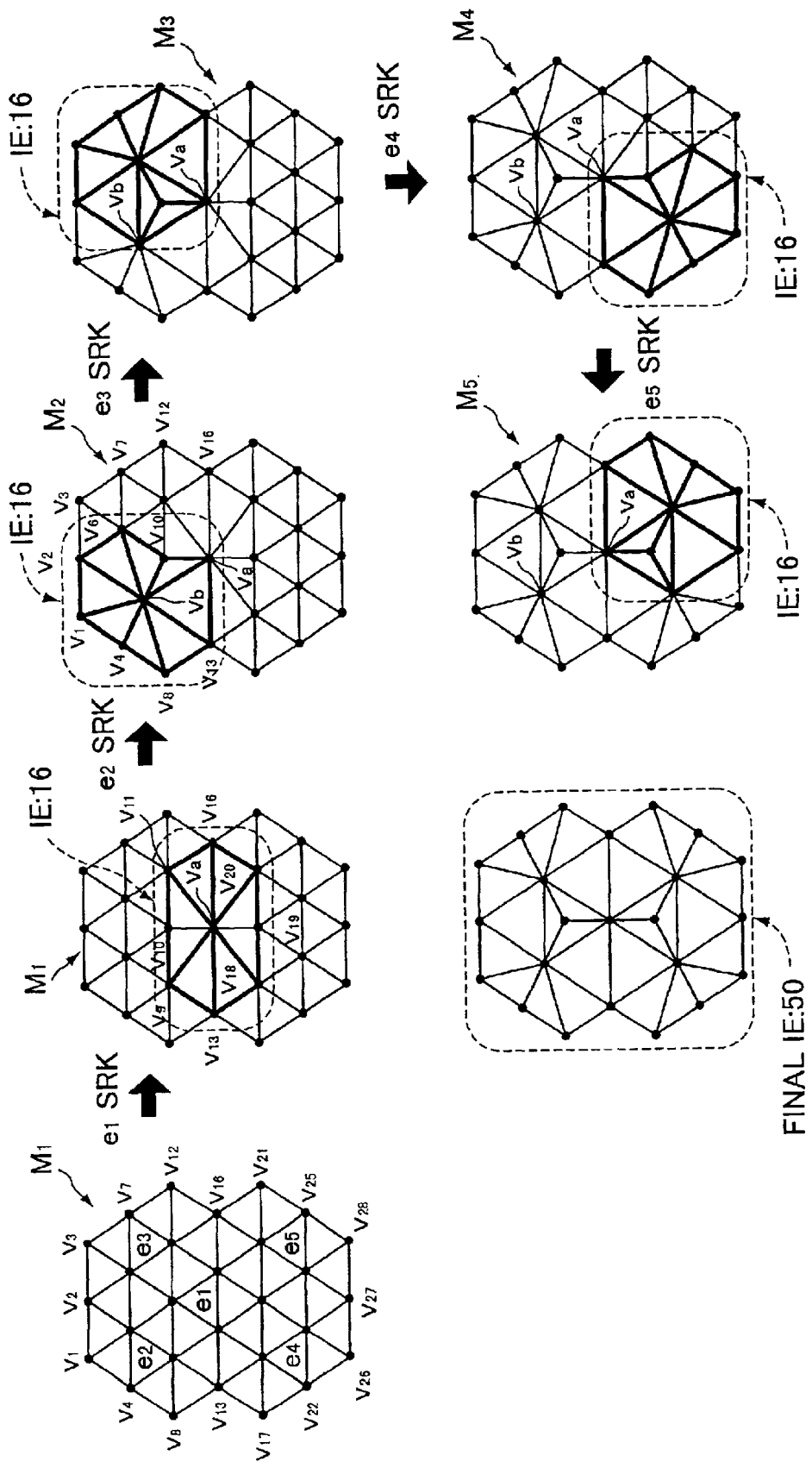
FIG. 14 is a diagram showing an example of a data reducing process by the operation procedure shown in FIG. 13.

FIG. 14 shows an exemplary data reduction process by the operation procedure shown in FIG. 13. In FIG. 14, a polygon model $M_0$ is an original polygon model. This polygon model $M_0$ is formed by arraying 28 vertices $v_1$, $v_2$, ... $v_{28}$ in 7 rows such that the numbers of the vertices in the respective rows are (3, 4, 5, 4, 5, 4, 3) and connecting adjacent vertices.

Edges e1, e2, e3, e4, e5 are selected as such to be successively shrunk by the operation procedure shown in FIG. 13 to simplify the description since they are not mutually influenced in the case that the respective edges e1 (i=1, 2, ... 5) are shrunk.

Accordingly, the data reduction process of FIG. 14 shows a case where the edges e1, e2, ... e5 of the polygon model $M_0$ are successively shrunk by the operation procedure of FIG. 13. Polygon models $M_1$, $M_2$, $M_3$, $M_{4\ 1}$, $_{M5}$ are approximated polygon models obtained when the polygon model $M_0$ is successively approximated by successively shrinking the edges e1, e2, ... e5.

According to the procedure of the data reduction processing shown in FIG. 13, when the polygon model $M_0$ is first approximated to the polygon model $M_1$ by shrinking the edge e1 by the first edge shrinking processing, edges formed by a converged vertex $v_a$ and its neighboring vertices $v_9$, $v_{10}$, $v_{11}$, $v_{13}$, $v_{16}$, $v_{18}$, $v_{19}$, $v_{20}$ (vertices located within a dotted-line frame in the polygon model $M_1$) are influenced. Thus, in the next edge shrinking processing, the estimation values $\epsilon_q$ are sorted again for the edges (those located outside the dotted-line frame of the polygon model $M_1$) excluding the above edges, and the polygon model $M_1$ is approximated to the polygon model $M_2$ by shrinking the edge e2 corresponding to the minimum estimation value Min$\{\epsilon_q\}$.

Further, since the edges defined by a converged vertex $V_b$ and the vertices $v_1$, $v_2$, $v_4$, $v_6$, $v_8$, $v_{10}$, $v_{13}$, $v_a$ (vertices located within a dotted-line frame in the polygon model $M_2$) are influenced in the next edge shrinking processing, the estimation values $\epsilon_s$ are sorted again for the edges (those located outside the dotted-line frame of the polygon model $M_2$) excluding the above edges, and the polygon model $M_2$ is approximated to the polygon model $M_3$ by shrinking the edge e3 corresponding to the minimum estimation value Min$\{\epsilon_s\}$.

The edge shrinking is applied to the edges e4, e5 by the same method, and the original polygon model $M_0$ is approximated to the polygon model $M_5$ and the number of data is reduced by 5 by the five edge shrinking processings.

If a process for approximating the original polygon model $M_0$ to a $6^{th}$ polygon model $M_6$ (not shown) is considered, no estimation value is recalculated for the edges having been influenced by the edge shrinking according to the operation procedure shown in FIG. 13. Thus, in the example of FIG. 14, when the estimation value is first calculated for 66 edges forming the original polygon model $M_0$, the evaluation values are recalculated for 50 edges forming the polygon model $M_5$ without calculating the estimation values again for the approximated polygon models $M_1$ to $M_4$. Therefore, the estimation values are recalculated 50 times until the $6^{th}$ polygon model $M_6$ is obtained.

On the other hand, since the estimation values are recalculating for the edges influenced by the edge shrinking according to the operation procedure shown in FIG. 7, the estimation values are recalculated for 16 edges influenced by the edge shrinking for each of the approximated polygon models $M_1$ to $M_5$. Thus, according to the operation procedure shown in FIG. 7, the estimation values are recalculated 80 (16×5) times until the $6^{th}$ polygon model $M_6$ is obtained. Therefore, the operation procedure shown in FIG. 13 has an advantage of high-speed processing since the estimation values are recalculated a reduced number of times.

Figure 15:
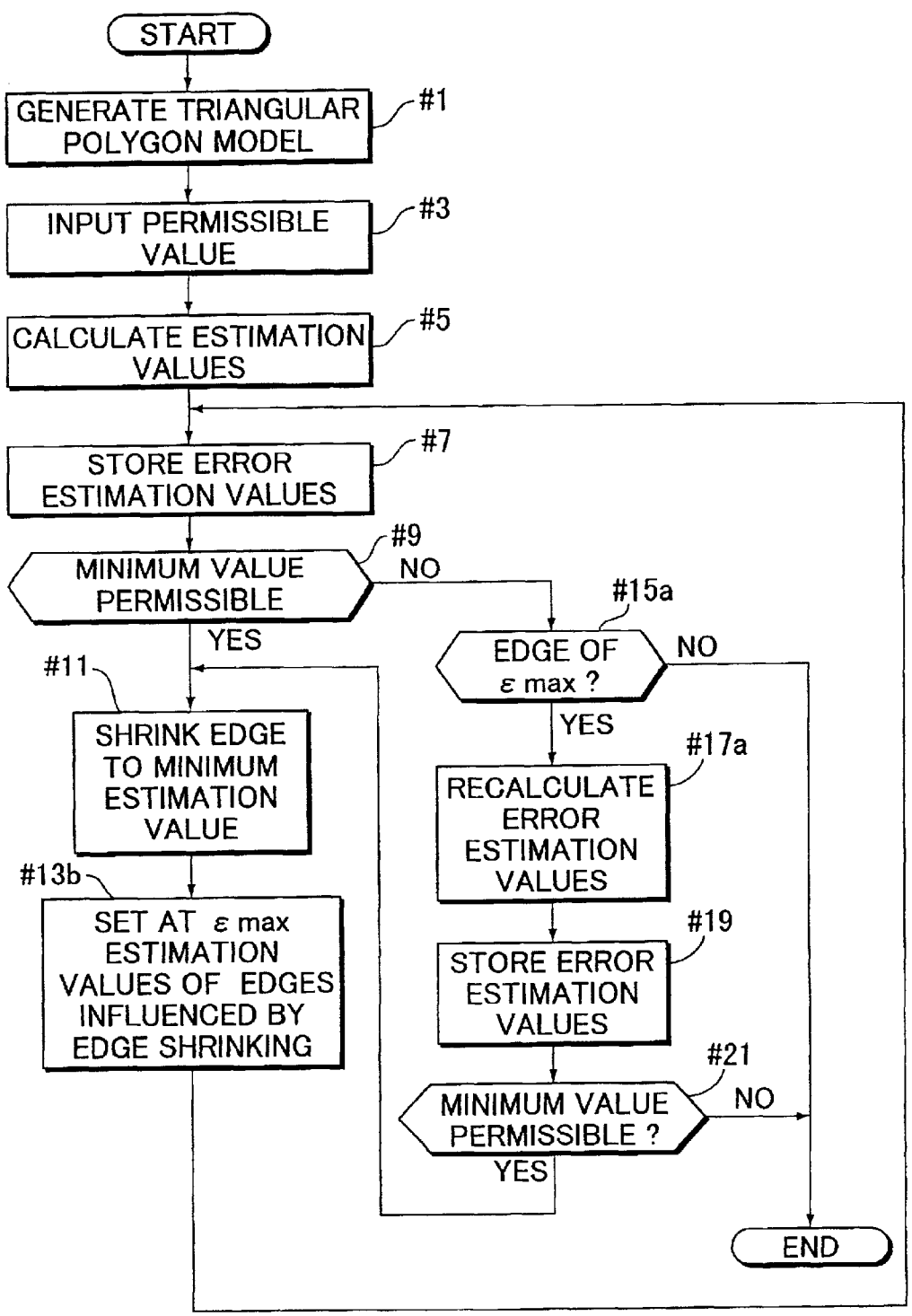
FIG. 15 is a diagram showing a modification of the flowchart shown in FIG. 13.

FIG. 15 shows a modification of the flowchart of FIG. 13. In the flowchart shown in FIG. 15, the edges influenced by the edge shrinking are made not to be shrunk in the next edge shrinking by replacing the estimation values thereof by a predetermined estimation value $\epsilon_{max}$ larger than the permissible value.

Specifically, the flowchart of FIG. 15 differs from that of FIG. 13 in that Step #13a is changed to Step #13b in which the estimation values of the edges influenced by the edge shrinking are set at $\epsilon_{max}$, and the discrimination criteria in Step #15 and the objects in Step #17 whose estimation values are recalculated are changed to "edges whose estimation values are $\epsilon_{max}$", and Steps #19 and #21 are added after Step #17a to shrink the edges whose estimation values are recalculated. Accordingly, only part of the flowchart of FIG. 15 different from that of FIG. 13 is described in detail below.

When the edge corresponding to the minimum estimation value Min$\{\epsilon_j\}$ is shrunk in the edge/surface shrinking section 323 (Step #11), the estimation values of the edges influenced by this edge shrinking processing are set at the predetermined estimation value $\epsilon_{max}$, larger than the permissible value (Step #13b) and then Step #7 follows. This operation is performed so as not to shrink these edges in the next shrinking processing, i.e., to apply the edge shrinking only to the edges not influenced by the edge shrinking processing this time.

Back in Step #7, evaluation values $\epsilon_i$ (q=1, 2, ... N-1) are sorted, and a minimum estimation value Min$\{\epsilon_i\}$ is calculated. It is then discriminated whether the minimum estimation value Min$\{\epsilon_i\}$ is equal to or below the permissible value (Step #9). If the minimum estimation value Min$\{\epsilon_i\}$ is equal to or below the permissible value (YES in Step #9), the edge corresponding to the minimum estimation value Min$\{\epsilon_i\}$ is shrunk in the edge/surface shrinking section 323 (Step #11).

Subsequently, the estimation values of the edges influenced by the edge shrinking processing this time are set at $\epsilon_{max}$ (Step #13b) and then Step #7 follows again. Thereafter, by repeating the above operations, the next edge shrinking processing is performed while setting the estimation values of the edges influenced by the edge shrinking process at $\epsilon_{max}$ every time the edge shrinking processing is performed (loop of Steps #7, #9, #11, #13).

On the other hand, if the minimum estimation value Min$\{\epsilon_i\}$ becomes smaller than the permissible value (NO in Step #9) while the edge shrinking processing is repeated, it is discriminated whether there is any edge having the estimation value of $\epsilon_{max}$ (Step #15a). If there are such edges (YES in Step #15a), the estimation values $\epsilon_s$ (s=1, 2, ... ) are calculated for these edges (Step #17a).

A minimum estimation value Min$\{\epsilon_s\}$ is calculated by discriminating the error estimation values $\epsilon_s$ (Step #19). If the minimum estimation value Min$\{\epsilon_s\}$ is equal to or below than the permissible value (YES in Step #21), Step #11 follows in which the edge corresponding to the minimum estimation value Min$\{\epsilon_s\}$ is shrunk.

On the other hand, if there is no more edge having the estimation value of $\epsilon_{max}$ (NO in Step #15a) or the minimum estimation value Min$\{\epsilon_s\}$ of the estimation values $\epsilon_s$ calculated for the edges having the estimation value of $\epsilon_{max}$ becomes larger than the permissible value (NO in Step #21) while the edge shrinking processing is repeated, the data reduction processing by the edge shrinking is completed.

Since the shrinking of the edges influenced by the edge shrinking is prohibited in the operation procedure of FIG. 15 as in the operation procedure of FIG. 13 by setting the estimation values of such edges at the estimation value $\epsilon_{max}$ larger than the permissible value, the estimation values are recalculated a reduced number of times and high-speed processing can be performed.

In the procedures of the data reduction processing shown in FIGS. 13 and 15, the estimation values are not calculated for the edges influenced by the edge shrinking processing, i.e., these edges are not shrunk until the edge shrinking processing is prohibited for all edges. However, the prohibition of the edge shrinking processing may be released if a specified condition is met such as when the edge shrinking processing is repeated a specified number of times or when a difference between the minimum estimation value and the permissible value lies within a specified range, and the edge shrinking may be made possible again by recalculating the estimation values for all edges.

Such an arrangement enables the data reduction processing to be applied to the edges for which the edge shrinking processing is prohibited, but the data reduction processing can be performed within a permissible error range. Therefore, data can be maximally efficiently reduced within a permissible range.

Since the procedures of the data reduction processings shown in FIGS. 13 and 15 are designed to increase the processing speed by reducing the number of times the estimation values are recalculated, the estimation values are not limited to the errors $\epsilon$ expressed by equation (6). The data reduction according to the present invention is widely applicable even in the case that estimation values are changed by the edge shrinking or surface shrinking and need to be recalculated after shrinking, for example, those disclosed in the aforementioned paper "Surface Simplification Using Quadric Error Metrics" are adopted.

Although reduction of the three-dimensional measurement data obtained by the three-dimensional shape measuring apparatus 1 is described in the foregoing embodiment, the present invention is not limited thereto and is widely applicable to three-dimensional data created by computer graphics or the like.

As described above, the three-dimensional shape data are reduced by converging two or more vertices to one vertex to shrink the edges or surfaces. Specified estimation values are calculated for all the surfaces deformed by shrinking the edges or surfaces of the polygon model based on the distances between the respective surfaces and all the original vertices involved in the deformation of these surfaces. The three-dimensional shape data are reduced by edge shrinking or surface shrinking when the estimation values are equal to or below a predetermined permissible value. Accordingly, the error can be controlled by the estimation standard intuitively easily understandable, i.e., by approximation errors from the original three-dimensional shape data.

Also, even in the case that, for example, the orientation of the surface locally experiences a sudden change into a zigzag surface in the polygon model, the data reduction processing can be suitably performed while the errors are relatively precisely controlled.

Particularly, since the estimation values are assumed as errors $\epsilon$ defined by Equation (6), the errors $\epsilon$ can be easily calculated only by storing an error matrix calculated for the original three-dimensional shape data. Thus, a high-speed processing is possible and a memory necessary for the calculation of the data reduction processing can be efficiently utilized.

Furthermore, the three-dimensional shape data is reduced by repeating the edge or surface based on estimation values. However, the application of the shrinking to the edges influenced by the previous edge shrinking is prohibited. Accordingly, recalculation of estimation values can be executed a reduced number of times, which thus enables a higher speed processing.

The converged vertex portions, which are influenced by the edge or surface shrinking, are given with a predetermined value to place these portions out of the shrinking, which can thus assure easier shrinking prohibition to a particular portion.

Moreover, in the case that a specified condition is satisfied, the prohibition is released to allow the shrinking processing to the prohibited portion again. Accordingly, data reduction can be accomplished as efficiently as possible within a permissible range.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. A method for reducing three-dimensional shape data, comprising the steps of:

calculating estimation values for surfaces to be deformed by shrinking edges or surfaces of a polygon model by converging two or more vertices of the polygon model based on distances between the respective deformed surfaces after each deformation resulted from the convergence of the vertices and all of the original vertices before the convergence involved in the surface deformation resulted from the convergence of the vertices, comparing calculated estimation values with a predetermined permissible value; and reducing the number of data for the polygon model by shrinking edges or surfaces of the polygon model when the estimation values are equal to or below the predetermined permissible value.

2. A method according to claim 1, wherein the estimation value is an error $\epsilon$ defined by Equation (A):

$$\epsilon = \frac{\sum_{i=1}^{n}\left(P_i^T \cdot \sum_{j=1}^{m_i} Kv_j \cdot P_i\right)}{\sum_{i=1}^{n} m_i} \quad (A)$$

wherein:

$p_i$ denotes a column vector for an equation of a plane $P_i$ subject to the deformation;

$p_i^T$ denotes an inverse matrix of $P_i$;

$Kv_j$ denotes an error matrix for a j-th vertex $v_j$ involved in the deformation of the plane $p_i$ when an error matrix for data of an original vertex v involved in the deformation of the plane $p_i$ is defined by $K_v = v \cdot v^T$ (v denotes a column vector for the data);

$m_i$ denotes a sum of error matrix $Kv_j$ for a vertex $v_j$ involved in only the deformation of the i-th plane $p_i$; and n denotes a sum of planes $p_i$ to be deformed.

3. A method according to claim 1, wherein the polygon model includes a number of triangular polygons.

4. A method for reducing three-dimensional shape data, comprising the steps of:

calculating respective estimation values based on a predetermined estimation method for a plurality of portions of a polygon model that are to be deformed by converging two or more vertices of the polygon model; and reducing the number of data for the polygon model by converging two or more vertices of one portion of the polygon model based on the calculated estimation values after another portion, repeatedly, wherein before each data reduction, the portion that the estimation value thereof is necessary to be recalculated for the predetermined estimation method as a result of the previous data reduction by the convergence of the vertices is defined as a reduction prohibition area, and a succeeding data reduction by the convergence of the vertices is applied to a portion other than the reduction prohibition area.

5. A method according to claim 4, wherein the reduction prohibition area is released if a predetermined condition is satisfied.

6. A method according to claim 5, where the predetermined condition is a state that there is no portion to be deformed by converging two or more vertices.

7. A method according to claim 5, wherein the predetermined condition is a state that a predetermined number of data reductions are completed.

8. An apparatus for reducing three-dimensional data, comprising:

an estimation value calculator which calculates estimation values for surfaces to be deformed by shrinking edges or surfaces of a polygon model by converging two or more vertices of the polygon model based on distances between the respective deformed surfaces after each deformation resulted from the convergence of the vertices and all of the original vertices before the convergence involved in the surface deformation resulted from the convergence of the vertices;

a comparator which compares calculated estimation values with a predetermined permissible value; and a data reducing device which reduces the number of data for the polygon model by shrinking edges or surfaces of the polygon model when the estimation values are equal to or below the predetermined permissible value.

9. An apparatus according to claim 8, wherein the estimation value is an error $\epsilon$ defined by Equation (A):

$$\epsilon = \frac{\sum_{i=1}^{n}\left(P_i^T \cdot \sum_{j=1}^{m_i} Kv_j \cdot P_i\right)}{\sum_{i=1}^{n} m_i} \quad (A)$$

wherein:

$p_i$ denotes a column vector for an equation of a plane $p_i$ subject to the deformation;

$P_i^T$ denotes an inverse matrix of $p_i$;

$Kv_j$ denotes an error matrix for aj-th vertex $Kv_j$ involved in the deformation of the plane $p_i$ when an error matrix for data of an original vertex v involved in the deformation of the plane $p_i$ is defined by $K_v = v \cdot v^T$ (V denotes a column vector for the data);

$m_i$ denotes a sum of error matrix $Kv_j$ for a vertex $v_j$ involved in only the deformation of the i-th plane $p_i$; and n denotes a sum of planes $p_i$ to be deformed.

10. An apparatus according to claim 9, wherein the estimation value calculator calculates an error matrix kv for each of all the vertices v constituting an original polygon model; and when two or more vertices $v_p$ (p=1, 2, ...) are converged into one vertex $v_q$ the estimation value calculator calculates an error $\epsilon$ in accordance with the above-defined Equation (A) by using a sum of error matrix $kv_p$ for each converged vertex $v_p$ as an error matrix $kv_q$ for the vertex $V_q$.

11. An apparatus according to claim 10, wherein the estimation value calculator includes a memory which stores only diagonal elements and elements above them for the error matrix calculated for the original vertex $v_i$, and the estimation value calculator restores the error matrix using the diagonal elements and elements above them stored in the memory, and calculates an error $\epsilon$ in accordance with the above-defined Equation (A) by using the restored error matrix.

12. An apparatus according to claim 9, wherein the estimation value calculator calculates $$\sum_{i=1}^{n} m_i$$

of the above-defined Equation (A) by adding an element at the right bottom corner of error matrix $\Sigma kv_j$ (j=1, 2, ... $m_i$) for each plane $p_i$ when the column vector v or data of the original vertex is defined by Equation (B):

$$V = \begin{bmatrix} v_x \\ v_y \\ v_z \\ 1 \end{bmatrix}. \quad (B)$$

13. An apparatus according to claim 9, wherein the estimation value calculator calculates an error $\epsilon$ in accordance with the above-defined Equation (A) by using a weighted error matrix $w_j \cdot kv_j$ for the vertex $v_j$ in place of $Kv_j$.

14. An apparatus according to claim 8, wherein the polygon model includes a number of triangular polygons.

15. An apparatus for reducing three-dimension shape data, comprising:

an estimation value calculator which calculates respective estimation values based on a predetermined estimation method for a plurality of portions of a polygon model that are to be deformed by converging two or more vertices of the polygon model;

a judging device which judges based on a calculated estimated value whether a portion of the polygon model is permissible for the deformation;

a data reducing device which reduces the number of data of the polygon model by converging two or more vertices of one allowed portion based on calculated estimation values after another allowed portion; and a prohibition area defining device which defines a portion that the estimation value thereof is necessary to be recalculated for the predetermined estimation method as a result of the previous data reduction by the convergence of the vertices executed by the data reducing device by the convergence of the vertices as a prohibition area to keep a succeeding data reduction from being applied.

16. An apparatus according to claim 15, wherein the prohibition area defining device changes the estimation value for an involved portion to a predetermined value to render the involved portion impermissible by the judging device.

17. An apparatus according to claim 15, further comprising a prohibition releasing device which releases the prohibition area according to a predetermined condition.

18. An apparatus according to claim 17, where the predetermined condition is a state that there is no portion to be deformed by converging two or more vertices.

19. An apparatus according to claim 17, wherein the predetermined condition is a state that a predetermined number of data reductions are completed.

20. An apparatus according to claim 15, wherein the judging device includes:

a minimum estimation value calculator which calculates a minimum estimation value;

a comparator which compares the minimum estimation value with a permissible value; and a determiner which determines a portion having the minimum estimation value as a portion to be converged when the minimum estimation value is equal or below the permissible value.

21. An apparatus according to claim 15, wherein the portion to be converged is an edge of a triangular polygon.

22. An apparatus according to claim 15, wherein the portion to be converged is a surface of a triangular polygon.

* * * * *